United States Patent
Takagi et al.

(10) Patent No.: US 6,560,072 B2
(45) Date of Patent: May 6, 2003

(54) BASE PLATE FOR A SUSPENSION OF A DISK DRIVE FIXED TO A LOAD BEAM HAVING A NOTCH FOR REDUCING THE SIZE OF A BURR

(75) Inventors: Yasuji Takagi, Ebina (JP); Kazuhiko Otake, Atsugi (JP); Takeshi Kamisaku, Aiko-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 10/041,843

(22) Filed: Oct. 24, 2001

(65) Prior Publication Data

US 2002/0063997 A1 May 30, 2002

Related U.S. Application Data

(62) Division of application No. 09/368,443, filed on Aug. 4, 1999, now abandoned.

(30) Foreign Application Priority Data

Aug. 7, 1998 (JP) .......................................... 10-224637

(51) Int. Cl.$^7$ ................................................ G11B 21/16
(52) U.S. Cl. ................................................... 360/244.5
(58) Field of Search .......................... 360/244.5, 245.2, 360/244.6

(56) References Cited

U.S. PATENT DOCUMENTS

| 5,012,367 A | * | 4/1991 | Toensing |
| 5,313,355 A | | 5/1994 | Hagen |
| 5,383,078 A | * | 1/1995 | Kato et al. |
| 5,717,545 A | * | 2/1998 | Brooks, Jr. et al. |
| 5,808,835 A | * | 9/1998 | Fujiwara |
| 5,833,777 A | | 11/1998 | Hanrahan et al. |
| 6,033,755 A | * | 3/2000 | Hanrahan et al. |
| 6,046,885 A | * | 4/2000 | Aimonetti et al. |

FOREIGN PATENT DOCUMENTS

JP        2000-057723        *    2/2000

* cited by examiner

*Primary Examiner*—Craig A. Renner
(74) *Attorney, Agent, or Firm*—Frishauf, Holtz, Goodman & Chick, P.C.

(57) ABSTRACT

A base plate of a suspension for a disk drive includes a shear surface formed on one end of the base plate and a notch formed along the shear surface so as to contain the shear surface. The notch is formed on each of the obverse and reverse sides of the base plate. The notches are designed so that $(\alpha+\beta)/t$ ranges from 0.3 to 0.5 it the respective depths of the two notches and the thickness of the base plate are $\alpha$, $\beta$ and $t$, respectively.

4 Claims, 6 Drawing Sheets

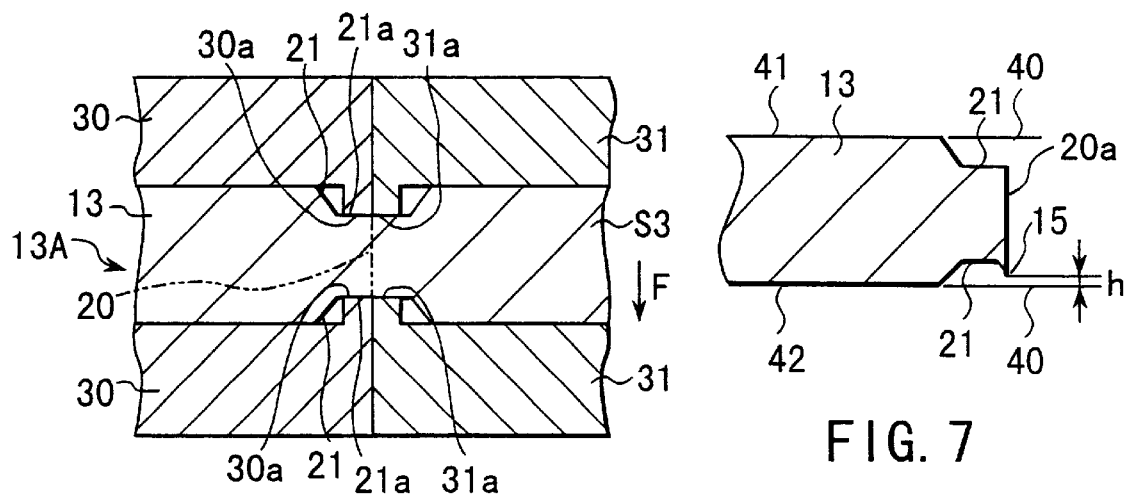
FIG. 6
FIG. 7
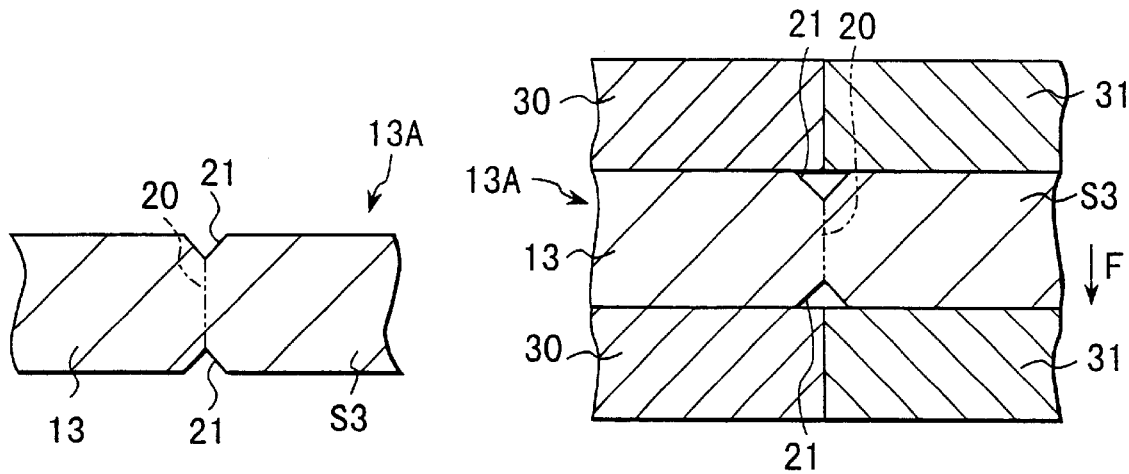
FIG. 8
FIG. 9
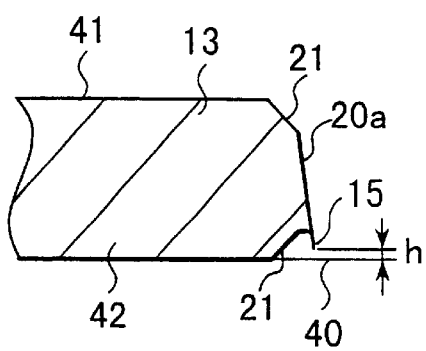
FIG. 10
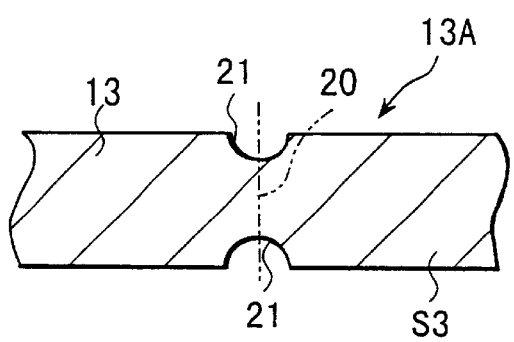
FIG. 11

BASE PLATE FOR A SUSPENSION OF A DISK DRIVE FIXED TO A LOAD BEAM HAVING A NOTCH FOR REDUCING THE SIZE OF A BURR

This is a division of pending application Ser. No. 09/368,443 filed Aug. 4, 1999.

BACKGROUND OF THE INVENTION

The present invention relates to a suspension for disk drive incorporated in an information processing apparatus, such as a personal computer, and a manufacturing method therefor.

A hard disk drive (HDD) includes a carriage that can turn around a shaft. The carriage is turned around the shaft by means of a positioning motor. The carriage is provided with a plurality of arms, suspensions arranged on the respective distal end portions of the arms, heads attached individually to the suspensions, etc. Each suspension comprises a load beam formed of a precision thin plate spring, a flexure formed of a very thin plate spring that is fixed to the distal end portion of the load beam by laser welding or the like, and a base plate fixed to the proximal portion of the load beam by laser welding or the like. The reverse side of the base plate is fixed to a suspension mounting surface of each arm.

In some cases, a load beam chain blank and a flexure chain blank are used in a process for manufacturing the suspensions. The load beam chain blank is obtained by forming a half-finished plate, having a plurality of load beams arranged in a line, by etching or the like and then press-molding the half-finished plate. The flexure chain blank is obtained by forming a half-finished plate, having a plurality of flexures arranged in a line at given pitches, by etching or the like and then press-molding the half-finished plate. On the other hand, the base plates are separately formed by press molding. In an assembly process, these base plates and the flexure chain blank are welded to predetermined portions of the load beam chain blank. Thereafter, useless portions (scrap portions) of the load beam chain blank and the flexure chain blank are cut off. Thus, independent suspensions are completed.

As described above, the base plates used in the conventional suspension manufacturing process are independent of one another. Therefore, the individual base plates are supplied as single parts to predetermined positions on the load beam chain blank, and are independently positioned by means of separate jigs. In this case, variation of the positioning jigs in workmanship, as well as variation of the base plates in working accuracy, may worsen the accuracy of the respective mounting positions of the base plates with respect to the load beams. Since the base plates are designed to be positioned as single parts on the jigs, moreover, the construction of the jigs is inevitably complicated. If the assembly process is automated, furthermore, the supply of the individual base plates requires use of a complicated base plate feeder.

As each base plate is formed by press molding, a "burr" is formed on the shear surface of the plate. Barreling or mechanical polishing operation is carried out to remove this burr. In consideration of the shape accuracy of the base plates and the stability of surface conditions, however, it is to be desired that the plates should be deburred by electropolishing. If the base plates are formed as single parts, however, it is hard to provide the base plates with electrodes for electropolishing.

To cope with these problems, an attempt has been made to handle the base plates in the form of a base plate chain blank in the suspension manufacturing process. The base plate chain blank is a half-finished plate that is composed of a plurality of base plates arranged at given pitches and connected to one another by means of a scrap portion. The base plates of the base plate chain blank are put individually on load beams that are formed on a load beam chain blank. After the load beams and the base plates are welded together, the respective scrap portions of the chain blanks are cut off. However, the following problem is aroused in this case.

In incorporating each suspension into the hard disk drive, each base plate is fixed to the upper or lower surface of an arm, a counterpart for mounting, by means of an adhesive agent, caulking means, etc. If a burr 15 exists on a shear surface that is exposed when the scrap portion is cut off, as shown in FIG. 18, therefore, it inevitably touches a suspension mounting surface 6a of an arm 6. Thereupon, part of a base plate 13 that is fixed to a load beam 11 is lifted to create a gap G between the arm 6 and the base plate 13. Since the base plate 13 will have already been completed by the time the gap G is formed, the burr 15 cannot be removed by barreling or electropolishing.

BRIEF SUMMARY OF THE INVENTION

Accordingly, the object of the present invention is to provide a suspension for a disk drive, capable of avoiding a bad influence exerted by burrs as a scrap portion is cut off from a base plate chain blank.

A manufacturing method according to one aspect of the present invention comprises a process for forming notches along cuttable portions at which a scrap portion of a base plate chain blank, having a plurality of base plates arranged in a line, is to be cut, a process for putting the base plate chain blank in a predetermined position on a load beam chain blank having a plurality of load beams arranged in a line, an assembly process for fixing the base plates to the load beams, individually, and a process for shearing the cuttable portions of the load beam chain blank, thereby cutting off the scrap portion, after the assembly process. The base plate chain blank and the load beam chain blank are used to manufacture a suspension, so that the load beams and the base plates can be easily positioned with respect to one another as they are joined together. Further, the construction of assembly jigs for attaching the load beams to the base plates and the automatic assembly process can be simplified. The base plates can be also electropolished before the scrap portion is separated from the base plate chain blank. Since the scrap portion of the base plate chain blank is sheared at the portions along which the notches are formed, burrs that are formed on cut surfaces are located inside the notches.

Each notch stated herein is a continuous groove that extends along each cuttable portion. The groove may be formed having a cross section in any of various shapes, including the shapes of a V, semicircle, etc., as well as those of tetragons, such as a trapezoid. The shape of the cross section is subject to no restrictions. The notch is formed on at least one of two opposite sides, obverse and reverse, of the base plate chain blank on which a burr is formed.

A suspension for disk drive according to another aspect of the invention comprises a load beam having a proximal portion and a distal end portion of the load beam and fitted with a head, and a base plate fixed to the proximal portion of the load beam and having a scrap shear surface formed on one end thereof and a notch formed along the shear surface so as to contain the shear surface. According to this suspension, a burr, if any, on the shear surface can be located inside the surface extension of the base plate. Thus, the burr can be prevented from interfering with the suspension mounting surface.

The notch may be formed on each of the obverse or reverse sides of the base plate. According to this arrangement, a burr, if any, on either side of the base plate can be prevented from projecting outside the surface extension of the plate surface. If either side of the base plate is put on the suspension mounting surface, the burr can be prevented from interfering with the mounting surface. In the bisymmetrical base plate that need not to be reversible for use, moreover, the notch may be formed only on the obverse or reverse side where the burr is formed. According to this arrangement, the construction of a die for forming the notch can be simplified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a sectional view showing part of the base plate chain blank of FIG. 1 and a cutting die;

FIG. 7 is a sectional view of a cut portion of a base plate cut by means of the die shown in FIG. 6;

FIG. 8 is a sectional view showing part of a base plate chain blank according to a second embodiment of the invention;

FIG. 9 is a sectional view showing part of the base plate chain blank of FIG. 8 and a cutting die;

FIG. 10 is a sectional view of a cut portion of a base plate cut by means of the die shown in FIG. 9;

FIG. 11 is a sectional view showing part of a base plate chain blank according to a third embodiment of the invention;

DETAILED DESCRIPTION OF THE INVENTION

An embodiment of the present invention will now be described with reference to FIGS. 1 to 7 and FIGS. 16 and 17.

Figure 16:
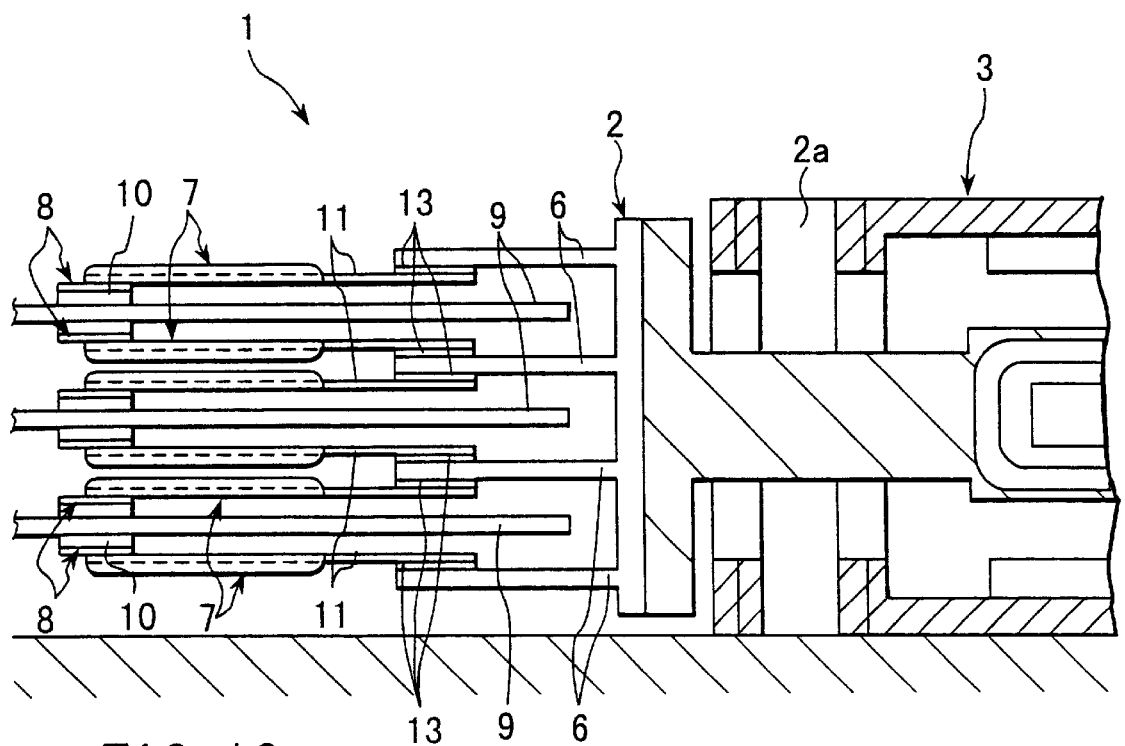
FIG. 16 is a side view, partially in section, showing an example of a hard disk drive.

An example of a hard disk drive (HDD) 1 shown in FIG. 16 includes a carriage 2 that can turn around a shaft 2a. The carriage 2 is turned around the shaft 2a by means of a positioning motor 3 such as a voice coil motor. The carriage 2 is provided with a plurality of arms (actuator arms) 6, suspensions 7 arranged on the distal end side of the arms 6, heads 8 attached individually to the respective distal end portions of the suspensions 7, etc. When the carriage 2 is actuated by the motor 3, each head 8 moves to a desired track of its corresponding disk 9.

Each head 8 includes a slider 10, which is situated in a position such that it can face the tracks of the disk 9, a transducer (not shown) held thereon, etc. When the disk 9 rotates at high speed, the slider 10 is slightly lifted from the disk 9, whereupon an air bearing is formed between the disk 9 and the slider 10.

Figure 17:
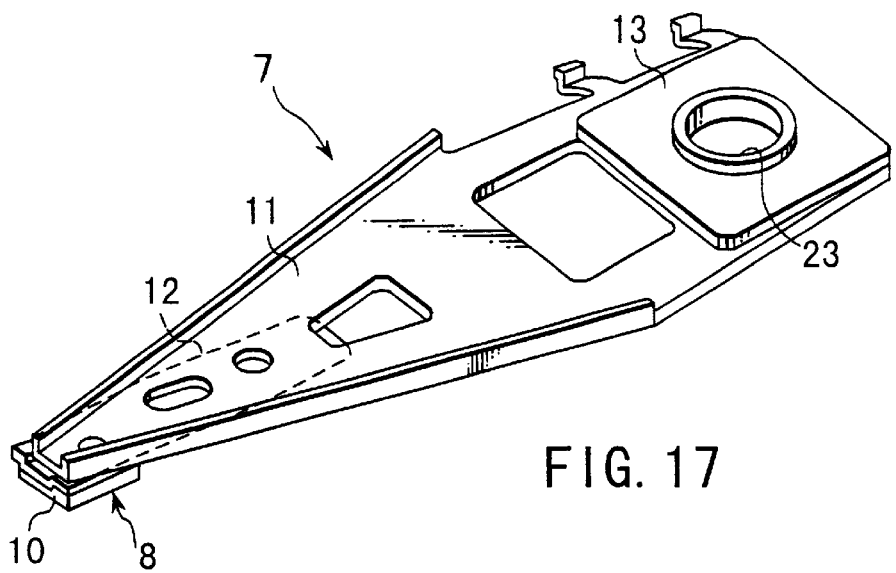
FIG. 17 is a perspective view showing an example of a suspension for the disk.
Figure 18:
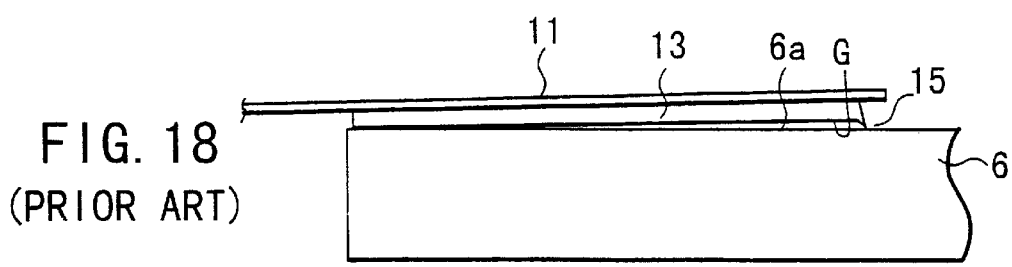
FIG. 18 is a side view showing a gap created by a burr between a base plate and an arm of a conventional suspension.

The arms 6 of the carriage 2 are vertically arranged, corresponding to the disks 9 in number. Each suspension 7 is fixed to the upper or lower surface of its corresponding arm 6. As shown in FIG. 17, an example of each suspension 7 comprises a load beam 11 formed of a precision thin plate spring, a flexure 12 formed of a very thin plate spring that is fixed to the distal end portion of the load beam 11 by laser welding or the like, and a base plate 13 fixed to the proximal portion of the beam 11 by laser welding or the like. The load beam 11, flexure 12, and base plate 13 are all formed of metal such as stainless steel. The head 8 is mounted on the flexure 12.

Figure 1:
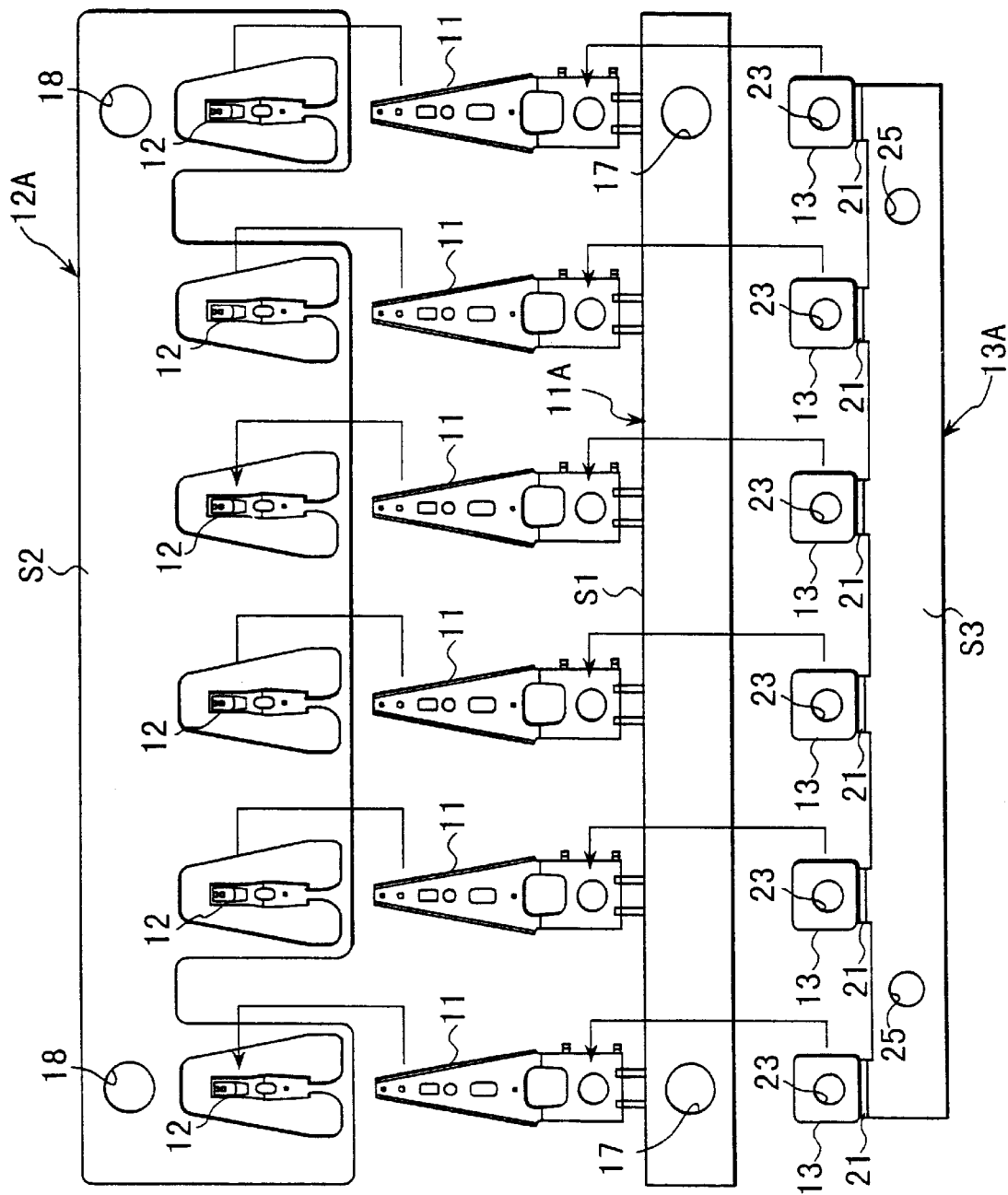
FIG. 1 is a plan view showing a base plate chain blank, load beam chain blank, and flexure chain blank according to a first embodiment of the present invention.

According to this embodiment, the suspensions 7 are manufactured using a load beam chain blank 11A, a flexure chain blank 12A, and a base plate chain blank 13A, as shown in FIG. 1. The load beam chain blank 11A includes a plurality of load beams 11, which are arranged in a line at given pitches, and a scrap portion S1 that connects the beams 11. Each load beam 11 of the chain blank 11A is formed into a predetermined shape by etching and press molding. Holes 17 are formed individually in predetermined positions on the load beam chain blank 11A. A pin (not shown) as a jig for positioning the chain blank 11A can be inserted into each hole 17.

The flexure chain blank 12A includes a plurality of flexures 12, which are arranged in a line at given pitches, and a scrap portion S2 that connects the flexures 12. Each flexure 12 of the chain blank 12A is formed into a predetermined shape by etching and press molding. Holes 18 are formed individually in predetermined positions on the flexure chain blank 12A. A pin (not shown) as a jig for positioning the chain blank 12A can be inserted into each hole 18.

Figure 4:
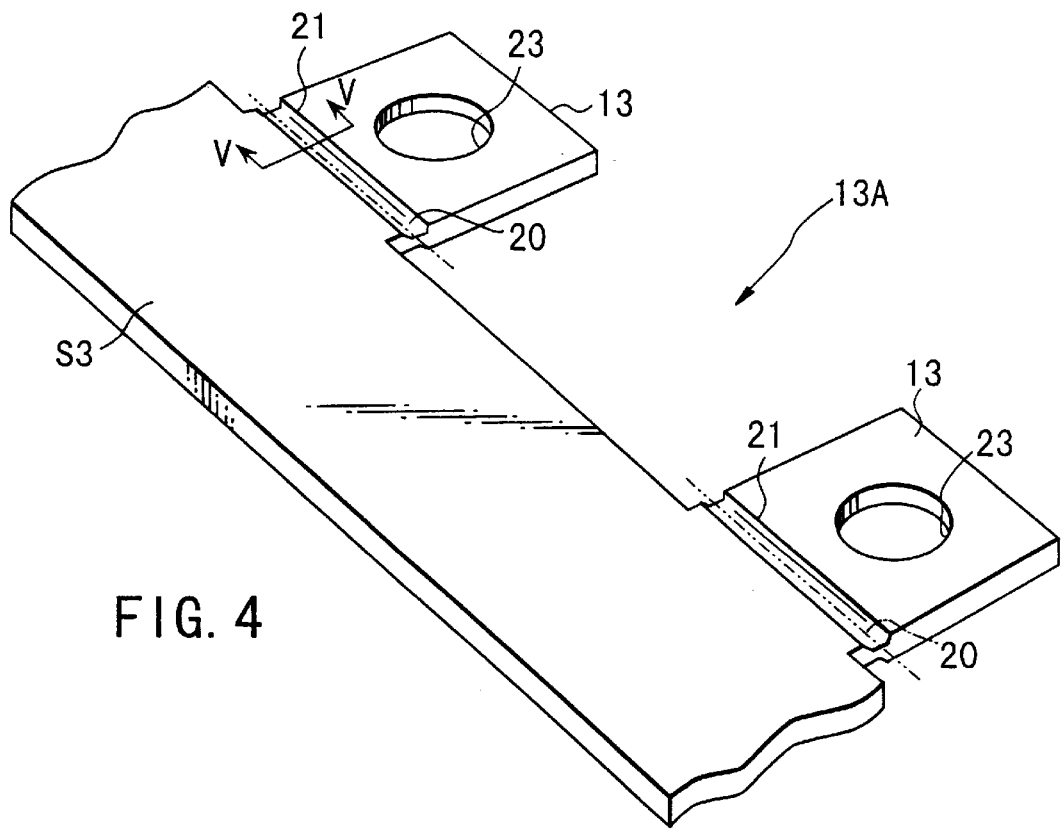
FIG. 4 is a perspective view showing part of the base plate chain blank of FIG. 1.
Figure 5:
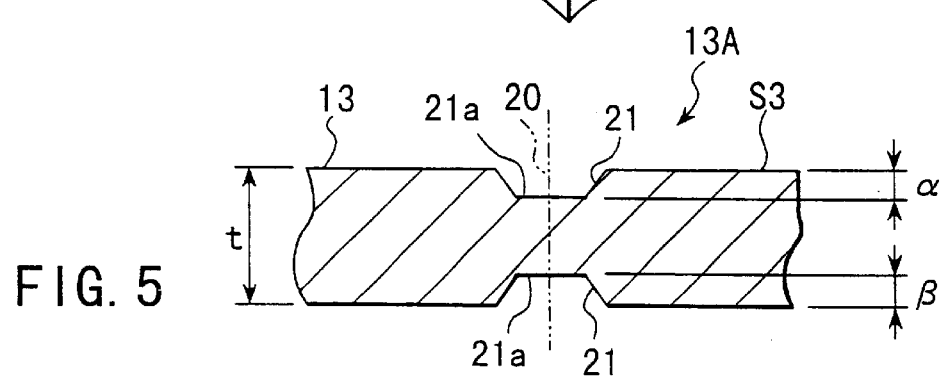
FIG. 5 is a sectional view taken along line V—V of FIG. 4.

The base plate chain blank 13A includes a plurality of base plates 13, which are arranged in a line at given pitches, and a scrap portion S3 that connects the base plates 13, and is formed by press molding. The thickness of the base plates 13 is greater than those of the load beams 11 and the flexures 12. As shown in FIG. 4, notches 21 are formed individually on the obverse and reverse sides of each base plate 13. The notches 21 extend along a portion 20 at which each base plate 13 is to be cut from the scrap portion S3. Each notch 21 is continuous in the longitudinal direction of the chain blank 13A along its corresponding cuttable portion 20, and covers the portion 20. As shown in FIG. 5, for example, each notch 21 may be a groove that has a trapezoid cross section. A bottom 21a of each notch 21 has a flat shape such that the bottom 21a can be held by means of a die 30 for clamping and a die 31 for cutting, which will be mentioned later.

The notches 21 are formed by press molding in a notch forming process. The notch forming process is carried out ahead of an assembly process (mentioned later). The notches 21 are formed on the cuttable portion 20 (indicated by two-dot chain line in FIG. 4) between each base plate 13 and the scrap portion S3. A boss hole 23 for fixing the base plate 13 in a predetermined position with respect to the load beam 11 is formed in the central portion of the base plate 13.

Figure 2:
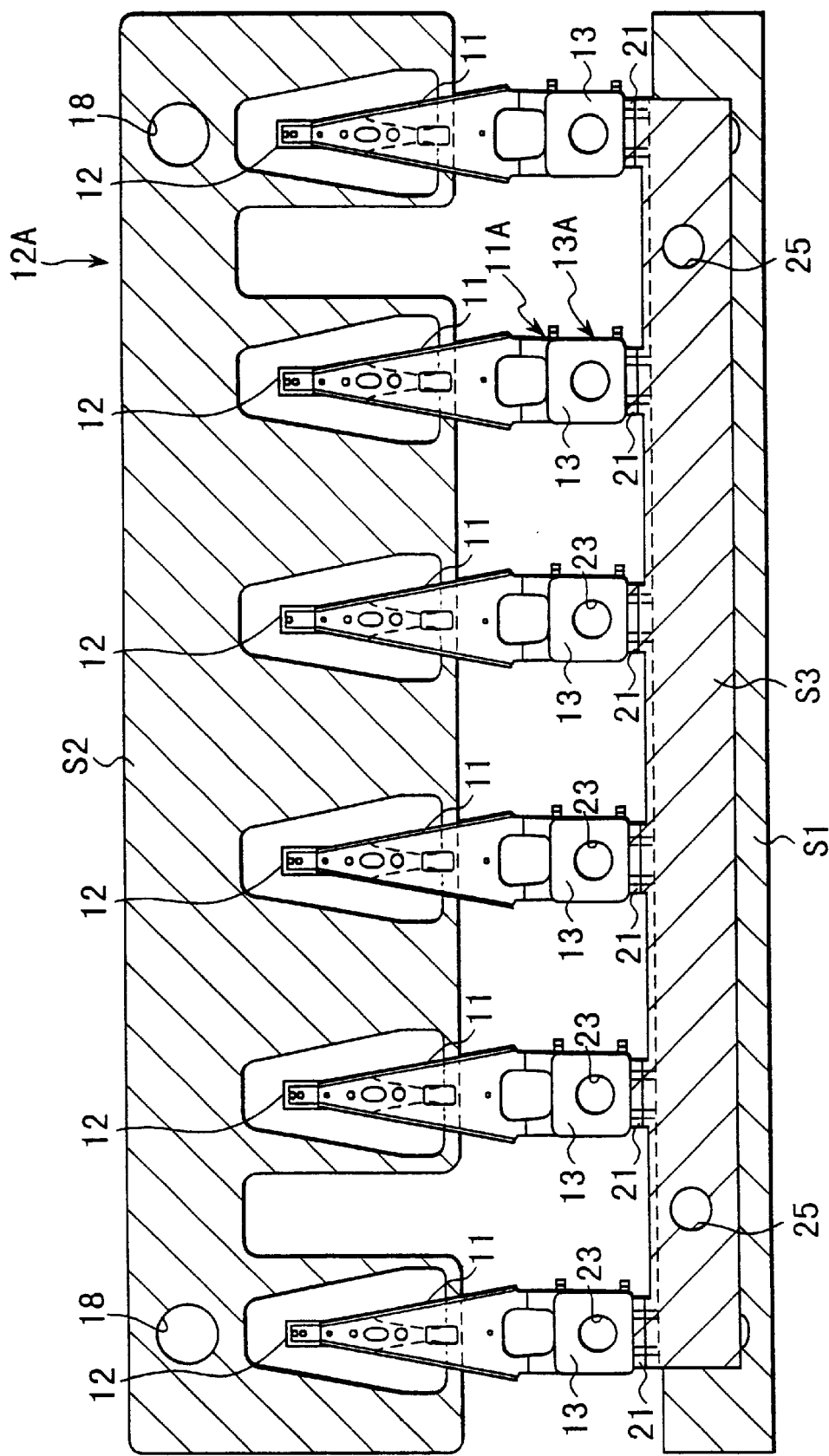
FIG. 2 is a plan view showing the chain blanks of FIG. 1 stacked in layers.

In a positioning process, as shown in FIG. 2, the flexure chain blank 12A and the base plate chain blank 13A are put in layers in a predetermined position on the load beam chain blank 11A, and the chain blanks 11A, 12A and 13A are positioned. A pair of positioning holes 25 are formed individually in the opposite end portions of the base plate chain blank 13A. The chain blank 13A is positioned with respect to the load beam chain blank 11A by means of jig pins (not shown) that are inserted individually in the holes 25. A plurality of base plates 13 can be supplied at a time to predetermined positions on the load beam chain blank 11A in a manner such that the scrap portion S3 or frame of the base plate chain blank 13A is chucked by means of a feeder (not shown).

Figure 3:
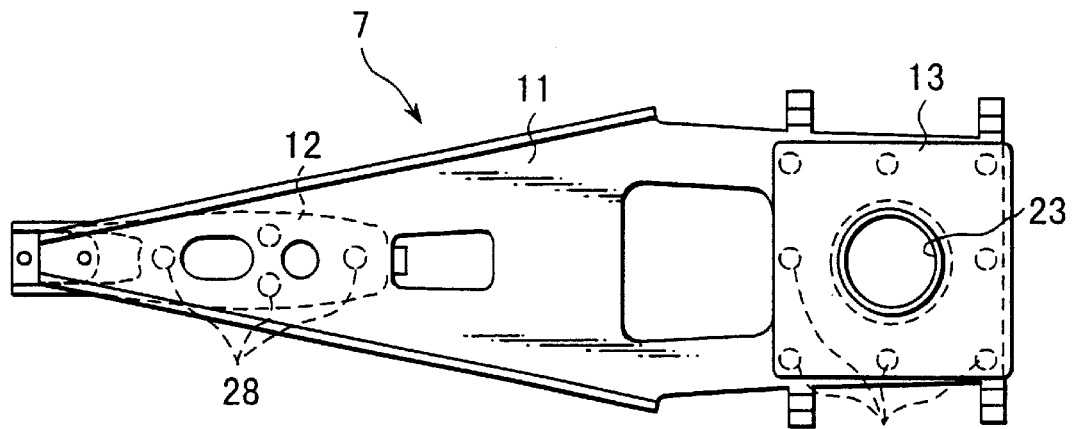
FIG. 3 is a plan view of a suspension for a disk manufactured using the chain blanks shown in FIG. 1.

After the positioning process is finished, the flexures 12 and the base plates 13 are fixed individually in predetermined positions on their corresponding load beams 11 by laser welding in the assembly process. In FIG. 3, numerals 28 and 29 denote welds.

A cutting process is carried out after the assembly process. In this cutting process, useless portions of the load beam chain blank 11A, flexure chain blank 12A, and base plate chain blank 13A, that is, the scrap portions S1, S2 and S3 hatched in FIG. 2, are cut off by press molding. In this manner, each suspension 7 shown in FIG. 3 is completed. In the cutting process, each cuttable portion 20 is held by means of the clamping die 30 and the cutting die 31, as shown in FIG. 6. The dies 30 and 31 have their respective portions 30a and 31a that are individually in contact with the respective bottoms 21a of the notches 21. As the cutting die 31 relatively moves in the direction of arrow F in FIG. 6, the cuttable portion 20 is sheared in the center of the bottoms 21a of the notches 21, whereupon the scrap portion S3 is separated from the base plates 13. As this is done, the portions 30a and 31a of the dies 30 and 31 hold the bottoms 21a of the cuttable portion 20 from both sides, obverse and reverse. Thus, deformation of the cut notches 21 and production of burrs can be reduced. Each base plate 13, from which the scrap portion S3 is separated, has a shear surface 20a on one end thereof.

In the cutting process, a burr 15 is formed on an edge of the cut shear surface 20a, as shown in FIG. 7. Since the shear surface 20a is located inside the notches 21, the tip of the burr 15 is situated inside an extension 40 of a surface of the base plate 13. Thus, some distance h can be secured between the tip of the burr 15 and the surface extension 40 of the base plate 13.

Accordingly, the burr 15 can be prevented from interfering with the suspension mounting surface of any of the arms 6 when the base plate 13 is put on the arm 6 in order to incorporate its corresponding suspension 7 into the disk drive 1 (shown in FIG. 16). In this embodiment, the notches 21 are formed individually on the obverse and reverse sides of each base plate 13. If the burr 15 is formed on either the obverse or reverse side of the base plate 13, corresponding to the cutting direction of the die 31, therefore, it can be located inside the surface extension 40 of the plate 13.

Let it be supposed that the thickness of each base plate 13 and the respective depths of the two notches 21 are $t$, $\alpha$ and $\beta$, respectively, $\alpha$ and $\beta$ being substantially equal, as shown in FIG. 5. If $(\alpha+\beta)/t$ or the ratio of total depth $(\alpha+\beta)$ of the notches 21 to the thickness $t$ is 0.2 or less, the burr 15 projects outside the surface extension 40 of the base plate 13, inevitably. If $(\alpha+\beta)/t$ is 0.3, the height of the burr 15 is nearly equal to the surface extension 40. Preferably, $(\alpha+\beta)/t$ should be adjusted to 0.4 or more so that the burr 15 is located inside the surface extension 40. If $(\alpha+\beta)/t$ exceeds 0.5, the formability of the notches 21 worsens, so that the shape of each notch 21 is very liable to become uneven. It is advisable, therefore, to adjust $(\alpha+\beta)/t$ to 0.3 to 0.5.

Each notch 21 may be formed having a V-shaped cross section, as shown in FIG. 8. In this case, the base plate 13 is held by means of the clamping die 30, and the cutting die 31 is relatively moved in the direction of arrow F, as shown in FIG. 9. By doing this, the cuttable portion 20 can be sheared so that the scrap portion S3 is separated from the base plate 13. Although the burr 15 is formed on the shear surface 20a in this case, as shown in FIG. 10, the tip of the burr 15 can be located inside the surface extension 40 of the base plate 13. Thus, the burr 15 can be prevented from interfering with the arm 6 when the base plate 13 is put on the arm 6.

Figure 12:
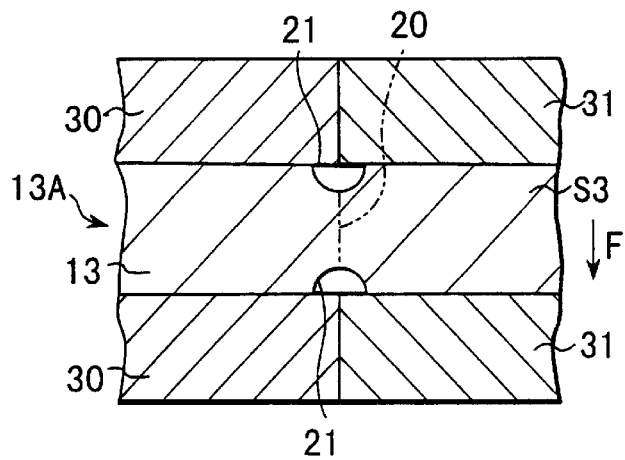
FIG. 12 is a sectional view showing part of the base plate chain blank of FIG. 11 and a cutting die.
Figure 13:
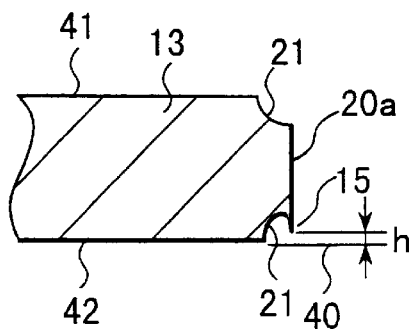
FIG. 13 is a sectional view of a cut portion of a base plate cut by means of the die shown in FIG. 11.

Alternatively, each notch 21 may be formed having a semicircular or U-shaped cross section, as shown in FIG. 11. As shown in FIG. 12, a base plate 13 having the semicircular or U-shaped notches 21 is held by means of the clamping die 30, and the cutting die 31 is relatively moved in the direction of arrow F. By doing this, the cuttable portion 20 can be sheared so that the scrap portion S3 is separated from the base plate 13. Although the burr 15 is formed on the shear surface 20a in this case, as shown in FIG. 13, the tip of the burr 15 can be located inside the surface extension 40 of the base plate 13. Thus, the burr 15 can be prevented from interfering with the arm 6 when the base plate 13 is put on the arm 6.

Figure 14:
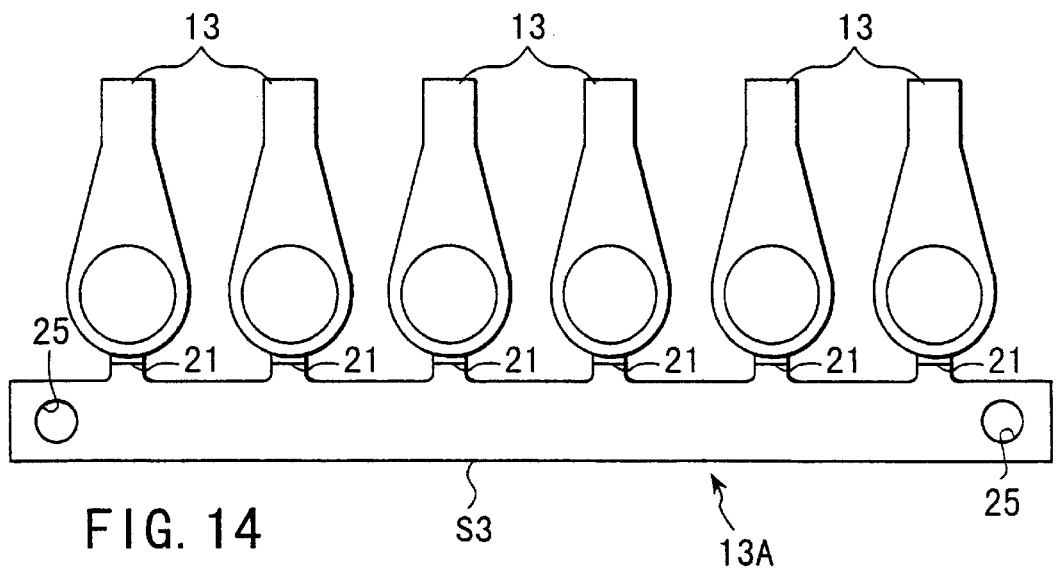
FIG. 14 is a plan view of a base plate chain blank according to a fourth embodiment of the invention.

FIG. 14 shows a case in which a base plate chain blank 13A having long-type base plates 13 arranged in a line is provided with the notches 21. Since each base plate 13 is not bisymmetrical in this case, its reverse side 42 is fixed to the load beam 11 when its obverse side 41 is put on the lower surface of the arm 6. Its obverse side 41 is fixed to the load beam 11 when its reverse side 42 is put on the upper surface of the arm 6. When the scrap portion S3 is cut off and separated from the base plate 13, therefore, a burr 15 may be formed on the obverse or reverse side 41 or 42 of the plate 13. In the case of this asymmetrical base plate 13, the burr 15 can be located inside the surface extension 40 of the plate 13 without regard to the side on which it is formed if the notch 21 is formed on each side. Thus, the burr 15 can be prevented from interfering with the arm 6 without regard to the side, obverse or reverse, of the base plate 13 that is put on the ram 6. In this case, the base plates 13 to be provided individually on the upper and lower surfaces of each arm 6 can be manufactured by using a common press tool, so that the manufacturing cost can be reduced favorably.

Figures 15A, 15B, 15C:
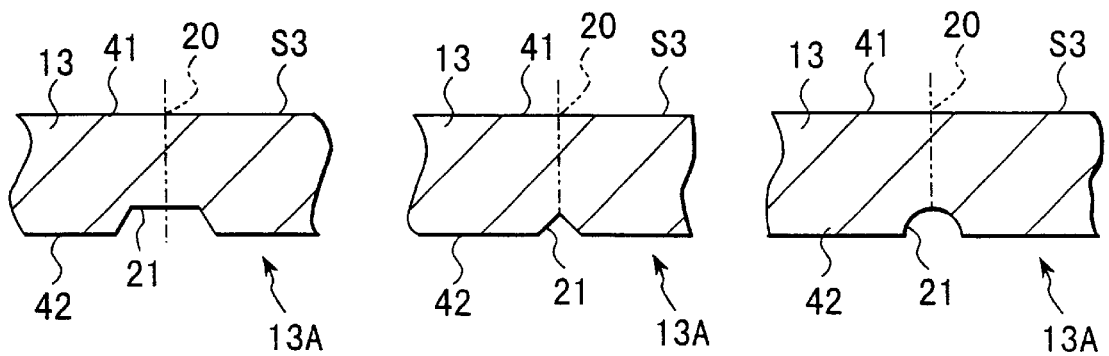
FIGS. 15A, 15B and 15C are sectional views partially showing base plate chain blanks according to fifth, sixth, and seventh embodiments of the invention, respectively.

Either the obverse or reverse side of the bisymmetrical base plate 13 shown in FIG. 3 can be put on the load beam 11. Therefore, a notch 21 is expected to be formed only on one side of the base plate 13, the obverse side 41 or the reverse side 42, as in embodiments shown in FIGS. 15A, 15B and 15C. FIGS. 15A, 15B and 15C show notches 21 having trapezoid (or tetragonal), V-shaped, and U-shaped cross sections, respectively. In the cases of these embodiments, the base plate 13 is put on the load beam 11 with its contact surface directed so that the burr 15 is formed on the notch side, and is cut by means of the dies 30 and 31.

It is to be understood that the present invention is not limited to the embodiments described above, and that various changes and modifications may be effected therein by one skilled in the art without departing from the scope or spirit of the invention. For example, the shapes of the base plates, base plate chain blank, load beams, load beam chain blank, notches, etc. and the components of the suspension may be changed or modified as required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A base plate for a suspension of a disk drive fixed to a load beam, comprising:
    a shear surface formed on one end of the base plate; and
    a notch formed along a length of at least one edge of the shear surface, wherein said notch is designed to have a depth of at least 0.3t and at most 0.5t where t is a thickness of the base plate,
    wherein said base plate has obverse and reverse sides, and wherein said notch is formed only on the obverse or reverse side where a burr is formed.

2. A base plate according to claim 1, wherein said plate has a plurality of edges including said at least one edge, and said notch is formed along only one of said edges of the base plate.

3. A base plate for a suspension of a disk drive fixed to a load beam, wherein said base plate has obverse and reverse sides, comprising:
    a shear surface formed on one end of the base plate;
    a first notch formed on the obverse side and along a length of the shear surface, and
    a second notch formed on the reverse side and along a length of the shear surface, wherein said first and second notches are designed to have a combined depth of at least 0.3t and at most 0.5t where t is a thickness of the base plate.

4. A base plate according to claim 3, wherein said first and second notches are configured so that $(\alpha+\beta)/t$ is at least 0.3 and at most 0.5 wherein the respective depths of the two notches and the thickness of the base plate are $\alpha$, $\beta$, and t, respectively.

* * * * *